June 25, 1968  M. WESTRUP  3,389,878
VTOL AIRCRAFT
Filed Jan. 19, 1966
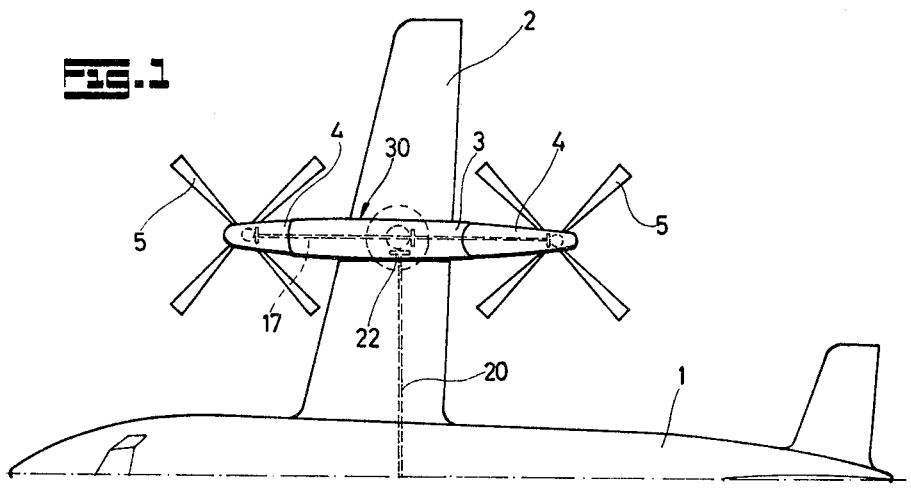
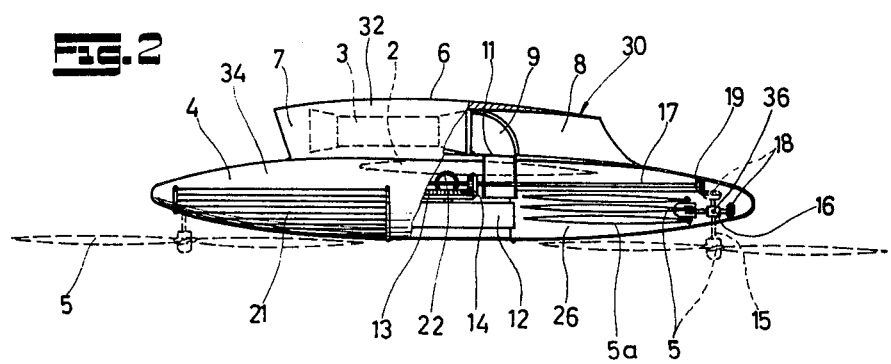
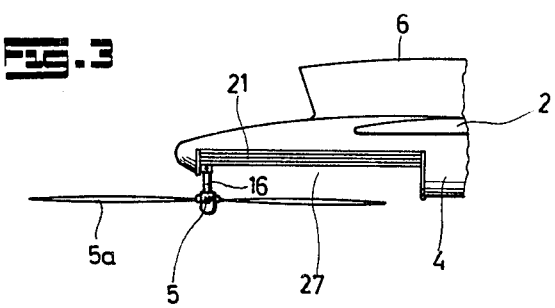
INVENTOR
Manfred Westrup
By  ATTORNEYS

United States Patent Office 3,389,878
Patented June 25, 1968

3,389,878
VTOL AIRCRAFT
Manfred Westrup, Ottobrunn, Germany, assignor to Bolkow Gesellschaft mit beschranker Haftung, Ottobrunn, near Munich, Germany
Filed Jan. 19, 1966, Ser. No. 521,629
Claims priority, application Germany, Feb. 2, 1965, B 80,350
13 Claims. (Cl. 244—12)

ABSTRACT OF THE DISCLOSURE

An aircraft includes a fuselage having a wing having a thrust engine mounted adjacent the top of the wing and a gondola which projects downwardly from the wing and which houses at least one rotor with foldable blades which may be folded to retract the rotor within the housing. The gondola may be opened to permit pivoting of the rotor so that its shaft extends downwardly and supports a hub and a plurality of blades around the hub for rotation around a substantially vertical axis to provide a lift rotor. In the preferred arrangement, the foldable and retractable rotor is carried at each end of the gondola and a gondola is carried on each wing on each side of the fuselage.

Summary of the invention

This invention relates, in general, to aircraft construction and, in particular, to a new and useful combination VTOL and STOL aircraft having a thrust engine for forward flight and including lifting and guiding rotors arranged in gondolas particularly for vertical takeoff and landing and which are driven by the gases from the thrust engine.

Airplanes are already known having gondolas arranged at the ends, or intermediate the ends, of wings which carry pivotal propellers or rotors which can be pivoted about axes extending transverse to the longitudinal axis of the airplane. These rotors may serve for the production of pure lift thrust and, after turning in a flying direction, for the production of a forward direction, for the production of a forward speed thrust. The rotors are usually driven through shafts and transmissions by power plants arranged in the gondolas carrying the propellers or by separate power plants arranged in the fuselage. It is also known to employ propellers mounted on separate spars for producing pure lift thrusts alone. Such propellers are usually also driven through shafts and transmissions by power plants arranged in the fuselage and they can be retracted together with the spars into a recess, as soon as the airplane has attained sufficient forward speed, in order to reduce the aerodynamic resistance and thus to attain a greater cruising speed. Such airplanes have good hovering capacity comparable to that of helicopters but they have the disadvantage that they can only attain cruising speed of the range for ordinary propeller-driven airplanes.

Some of the disadvantages indicated above are eliminated in a jet-propelled vertical take-off and landing airplane having a lifting rotor with a greater diameter than propellers which are provided for horizontal flight which are arranged adjacent the respective ends of the wings and which can be stopped in cruising flight and retracted into gondolas. In such a construction, the drive of the lifting rotors is effected by a power plant arranged in the fuselage driving through shafts and transmissions to the respective lifting rotors. In order to insure the steering capacity of the aircraft in hovering flight, the lifting rotors may be pivoted about the transverse axis. Due to this measure, the position of the airplane may be varied about its transverse axis while steering about the longitudinal axis can be achieved by a different rotor thrust.

An arrangement of two small lifting rotors instead of a centrally arranged large rotor has the advantage that the forces which will appear when the lifting rotors are stopped are smaller and therefore easier to control. A disadvantage, however, is that the rotor diameter corresponding to the required hovering capacity diameter results in a wing span which is unsuitable to high speed flight, particularly in the ultrasonic speed range. A further disadvantage for hovering flight is the fact that part of the thrust jets produced by the lifting rotor strikes the wings and the gondolas and therefore is wasted.

Vertical take-off and landing aircraft are also known which include lifting fans arranged in the wings for the production of the lift and which are driven by jet power plants or jet tubes and turbines. Since no difficulties of the type occurring in rotors of the above-mentioned type are encountered when starting or stopping such lifting fans, such lifting fans are superior in respect to lifting propellers and rotors, respectively. On the other hand, such lifting fans require great thicknesses and depth of profile on the wings due to their overall size, and this limits the attainable cruising speeds.

In accordance with the invention there is provided a vertical take-off and landing aircraft having the advantage of the known vertical take-off and landing aircrafts with regard to their attainable hovering capacity, good steerability during hovering flight, and utilization of the favorable efficiency of the lifting rotors and, in addition, do not provide a construction in which the cruising speed is reduced because of the harmful effects of air resistance of the projecting parts or parts of large dimensions. In accordance with the invention, one or more rotors are mounted in gondolas which also contain a thrust engine for horizontal thrust and also for directing thrust to a turbine for driving the rotors. The rotors are advantageously mounted so that they only need be moved to project downwardly out of the gondola or retracted inwardly into the gondola. By using the foldable mounting of the propellers or rotors, it is possible to utilize the favorable efficiency of the rotors or propellers for landing and take-off and for hovering flight and, because the rotors are advantageously driven from the horizontal flight thrust engine, the thrust engine is always available for high speed forward flight. Thus, the transition from vertical flight to horizontal flight may be accomplished easily, and after it is effected, the lifting rotors may be retracted into the gondolas so that they do not provide an air resistance in respect to the forward flight of the engine.

In a preferred arrangement each gondola advantageously includes two rotors which are driven from a single engine mounted thereabove. By dividing the production of the lifting thrust over the two smaller lifting rotors, the forces which appear during the transition between vertical and horizontal flight are reduced. This is because the fluttering phenomenon which has been known heretofore by the backflow of the rotor and propeller blades is easier to control in smaller rotors or propellers than in larger rotors, and when using a plurality of rotors, the phenomenon is partly compensated by the additional rotors. A further advantage is achieved by mounting the rotors adjacent the respective ends of the gondolas in order to make it possible to provide a steering moment about the longitudinal axis and about the transverse axis of the aircraft by varying the lifting thrust from one lifting rotor or propeller to the other. By arranging a rotor at each end of the gondola in a manner such that it can be retracted within the gondola, it is possible to design the aircraft with a profile and a wing formation which is not impaired so that the aircraft can have a desirable height speed profile.

In accordance with another feature of the invention, the propellers are mounted so that they may be folded inwardly and pivoted so that a bevelled driving gear arrangement is disconnected when they are retracted within the gondola. Each of the two propellers are driven through similar gearing and transmission shaft from a turbine which is supplied with thrust gases from the main thrust turbine mounted in the gondola directly above the propellers. An advantage of this arrangement is that no separate power plants are required for each rotor element and the whole unit may be accommodated within a single stream-lined gondola element.

In still a further feature of the invention, the gondola is arranged such that the cruising engine or thrust engine is mounted above the wings and the propellers or rotors are mounted below the wings in the same gondola structure. The gases from the thrust engine are deflected through the wing structure downwardly into the turbine for the rotors which is mounted below the wings also. In this manner, the waste gases from the turbines may be employed for driving the lift rotors to increase the total lifting thrust. It should be appreciated, however, that the lifting rotors may also be driven from one or more power plants arranged in the fuselage, for example, or directly adjacent each of the rotors in the gondola, if desired. In some instances, it may be desirable to locate the power plants, such as a thrust engine for the propellers within the central fuselage and provide ducts for the thrust gases outwardly through the gondoles for driving a turbine situated in the gondola for rotating the rotors.

Accordingly, it is an object of the invention to provide an improved aircraft gondola construction including a thrust engine mounted for producing horizontal thrust gases for forward flight and at least one rotor arranged in the gondola and movable downwardly into an active position for rotation about a vertical axis for producing a vertical lift, and which rotor is retractible into the gondola for horizontal flight.

A further object of the invention is to provide an aircraft having at least one gondola construction with a thrust engine and with one or more lifting rotors which are advantageously driven by gases from the thrust engine which are muonted for movement out of the gondola to provide a lifting thrust and may be retracted into the gondola when the cruising engine is providing a forward thrust.

A further object of the invention is to provide an aircraft having at least one wing with a gondola carried thereon, with a thrust engine mounted above the wing and with a turbine driving a plurality of lifting rotors mounted below the wing, and with gas-deflecting means to deflect operating gases from the cruising engine to the turbine for operating the same, and wherein the lifting rotors are retractible within the fuselage during forward flight.

A further object of the invention is to provide a gondola construction and an aircraft construction which are simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a top plan view of a portion of an aircraft constructed in accordance with the invention;

FIG. 2 is a partial elevational and partial sectional view of a gondola constructed in accordance with the invention with the location of the wing being schematically shown; and FIG. 3 is a partial view of the gondola indicated in FIG. 1 indicating the rotor in an extended position.

Referring to the drawings, in particular, the invention embodied therein comprises an aircraft body including a fuselage 1 and a wing 2 having a gondola generally designated 30 mounted thereon constructed in accordance with the invention.

In accordance with the invention, the gondola 30 includes an upper portion 32 defining an engine mounting for a thrust engine 3 having an air intake 7 and a thrust gas discharge 8. The upper portion 32 includes aerodynamic covering 6.

The gondola 30 also includes a lower streamlined portion 34 having forward and after gondolas 4, 4 with cavities 26 and 27 for housing retractible rotors or propellers 5. The complete gondola assembly 30 is mounted on spars or struts (not shown) of the wings 2.

The central compartment of the lower gondola portion 34 accommodates a gas turbine or working turbine 12 which receives thrust gases from the main engine 3 upon actuation of a deflector 9 for deflecting the gases downwardly through a connecting passageway or shaft 11 leading vertically downwardly to the turbine 12. When the turbine 12 is actuated, it rotates a bevel gear 13 affixed to its shaft and drives through bevel gear 14, a transmission shaft 17 which extends outwardly in each direction into the associated compartments 26 and 27 for each of the rotors 5, 5. Each shaft 17 terminates in a bevel gear 19 which will engage with a bevel gear 18 to rotate the rotors 5 when they are oriented with its axis 16 in a vertical position, as indicated in dotted lines in FIG. 2. When the rotors are retracted, the blades 5a are first folded inwardly and then the rotor shaft is pivoted about a pivot 36 within the gondola compartments 26 and 27 from the dotted line position indicated in FIG. 2 to the solid line position in which the entire rotor structure and its associated shaft is located within the compartment 26 or 27. Thereafter, a closing flap element 21 is moved to a closing position indicated to the left of FIG. 2 from the open position indicated in FIG. 3.

The deflecting device 9 may be oriented so that the thrust gases are directed outwardly through the thrust passage 8 for horizontal flight, and the transmission may be made gradually between supplying a maximum amount of thrust gases to the turbine 12 and thereafter a maximum amount out through the horizontal thrust passageway 8. The gases which are admitted to the turbine 12 through the shaft 11 may be waste gases which would normally not be fully available for generating horizontal thrust by the thrust engine 3.

In the preferred arrangement of the aircraft indicated in FIG. 1 in order to insure sufficient hovering safety in case a single power plant or turbine fails, all of the working turbines are interconnected with each other by a connecting shaft 20 which terminates at its outer end in bevel gears 22 which engage with the driving bevel gear 13. In this manner, any dropping off of speed of a defective or insufficiently admitted working turbine 12 is taken over by means of a freewheeling mechanism (not shown in the drawings), which is arranged between the turbine rotor and the driving bevel gear 13 to permit the defective turbine to disengage from the system and to stop.

The gondolas generally designated 30 are designed so that the lower portions 34 project over the wings 2 by about half the diameter of the propellers or rotors 5. The gondola portions 4 at each end have cavities 26 and 27 which are ample to accommodate the folded rotors 5 when they are retracted therewithin.

The operation of the aircraft described is as follows: First the louvre flaps 21 of the gondola covering the propeller recesses are displaced and the propellers swung out of the gondolas by means of devices not represented in the drawings or described fully herein. The details of the construction of such devices are not part of the present invention. When the propeller shafts 16 are rotated to the downward projecting position indicated in FIG. 3, the driving bevel gear 18 will be in meshing engagement with the driving bevel gear 19. The jet deflecting device 9 is advantageously connected with the means for swinging the propeller shafts to a vertical position so that they are arranged to deflect gases downwardly into the turbine 12 after the engine 3 is started. When the turbine 12 is started and brought up to speed, rotation of the axles of the rotor shafts will cause the rotor blades to unfold due to centrifugal force. The turbine 12 is then brought up to operating speed and the propellers produce a vertical thrust for lifting the aircraft off the ground in a vertical direction. As soon as the aircraft has obtained a sufficient altitude above the ground in vertical flight, the pitch of the propeller blades is so changed that the apparatus goes into a transition and the thrust gases are directed from the main power plant 3 out through the horizontal thrust passage 8. There is a transition period in which the rotors 5 sustain the aircraft in vertical forward thrust. With increasing horizontal speed, and thus increasing aerodynamic resistance, the propeller blades and the deflecting devices are continually further adjusted to produce less and less lifting thrust.

When sufficient forward flight speed has been achieved, the deflection of the waste gases of the main engine 3 is completely eliminated, so that full thrust of the power plant is now available for horizontal flight. The turbine 12 is then stopped completely, and the propellers 5 are folded and retracted into the recesses 26 and 27 in the gondola portions 4. Finally, the louvre flaps 21 are closed.

The landing approach and the landing of the aircraft are carried out in a similar manner.

It is possible to provide other arrangements than those shown in the drawings and described herein. For example, in some instances it is preferable to have the driving turbine 3 located within the fuselage 1 and to provide a driving transmission outwardly through the gondolas, such as by the drive shafts. Instead of cyclically adjustable propellers or rotors, it is also possible to use devices with the same or similar actions, for example, a rotor head tipping control. Furthermore, the unfolding and folding of the propellers and rotors can be effected by an electric drive instead of by mass and air forces, as described above.

While a specific embodiment of the invention has been shown and described in detail to illustrate the application of the inventive principles, it will be understood that the invention may be embodied otherwise without departing from such principles.

What is claimed is:

1. An aircraft comprising an aircraft body having a wing formation, a thrust engine for generating horizontal thrust for propelling said aircraft body in horizontal flight mounted on said aircraft body, a gondola mounted on said aircraft body, at least one lift rotor comprising a hub and a plurality of blades foldable about said hub carried in said gondola and being movable from a retracted position within said gondola to an operative position with said blades unfolded from said hub for rotation about a substantially vertical axis outside of said gondola for generating a lifting thrust for said aircraft body, and means connected to said rotor when in an operative position to rotate said rotor for generating vertical lifting thrust.

2. An aircraft comprising an aircraft body having a wing formation, a thrust engine for generating horizontal thrust for propelling said aircraft body in horizontal flight mounted on said aircraft body, a gondola mounted on said aircraft body, at least one lift rotor carried in said gondola and being movable from a retracted position within said gondola to an operative position for rotation about a substantially vertical axis outside of said gondola for generating a lifting thrust for said aircraft body, and means connected to said rotor when in an operative position to rotate said rotor for generating vertical lifting thrust, said gondola being mounted on said wing and including a portion above said wing, said thrust engine being in said portion above said wing.

3. An aircraft comprising an aircraft body having a wing formation, a thrust engine for generating horizontal thrust for propelling said aircraft body in horizontal flight mounted on said aircraft body, a gondola mounted on said aircraft body, at least one lift rotor carried in said gondola and being movable from a retracted position within said gondola to an operative position for rotation about a substantially vertical axis outside of said gondola for generating a lifting thrust for said aircraft body, and means connected to said rotor when in an operative position to rotate said rotor for generating vertical lifting thrust, said aircraft body including a fuselage having a wing, a gondola carried on said wing including an upper portion extending above said wing, said thrust engine being in said upper portion arranged horizontally for directing thrust gases substantially horizontally, said gondola including a lower portion projecting forwardly and rearwardly from said ring and wherein there is at least one rotor in each of the portions of said gondola, a driving turbine for said rotors connected to said thrust engine for receiving thrust gases therefrom for rotating said turbine.

4. An aircraft according to claim 1, wherein said means connected to said rotor to rotate said rotor includes a thrust engine.

5. An aircraft according to claim 1, wherein said thrust engine is mounted in said gondola.

6. An aircraft according to claim 2, including at least two rotors in said gondola located below said wing.

7. An aircraft according to claim 6, including a turbine located in said gondola below said thrust engine, and means for deflecting thrust gases from said thrust engine to said turbine, said turbine being connected to said rotor to rotate said rotor.

8. An aircraft according to claim 3, including means for deflecting thrust gases from said thrust engine to said driving turbine for said rotors.

9. An aircraft according to claim 3, wherein said gondola ends carrying said rotors project beyond said wing by half the rotor diameter.

10. An aircraft according to claim 8, including a transmission shaft connected to said turbine and extending into each of said forward and rear ends of said gondola, and bevel gear means drivingly connecting said rotor to said transmission shaft when said rotor is in an operative position.

11. An aircraft according to claim 3, including a fuselage and a wing extending outwardly from each side of said fuselage, at least one gondola on each of said wings, and transmission means interconnecting said turbines of each of said gondolas.

12. An aircraft according to claim 1, including a power plant for rotating said rotors on said aircraft body, and wherein said means connected to said rotor, when in an operative position to rotate said rotors, includes a shaft connected between said rotor and said power plant.

13. A gondola for an aircraft adapted to be mounted on a wing structure including an upper housing portion and a lower gondola portion having a forwardly and a rearwardly extending gondola portion forming separate rotor cavities, a thrust engine carried in said upper portion, said upper portion including a passage for discharging thrust gases from said thrust engine horizontally, a turbine mounted in said gondola, a first rotor mounted in the forward portion of said gondola, a second rotor mounted in the second portion of said gondola and being movable from a retracted position within said gondola to an operative position extending downwardly for rotation about a substantially vertical axis for generating a lifting thrust, shaft means connected between said turbine and said rotors for rotating said rotors when in an operative position, and means for deflecting gases from said thrust engine into said turbine for operating said turbine from said thrust engine.

References Cited

UNITED STATES PATENTS

| | | | |
|---|---|---|---|
| 3,084,888 | 4/1963 | Hertel | 244—56 X |
| 3,119,577 | 1/1964 | Andrews | 244—7 |
| 3,149,800 | 9/1964 | Sintes et al. | 244—7 |

FERGUS S. MIDDLETON, *Primary Examiner.*

MILTON BUCHLER, *Examiner.*

B. BELKIN, *Assistant Examiner.*